United States Patent [19]

Fellinger

[11] 3,961,138
[45] June 1, 1976

[54] ASYNCHRONOUS BIT-SERIAL DATA RECEIVER

[75] Inventor: Frank Fellinger, Delaware, Ohio

[73] Assignee: North Electric Company, Galion, Ohio

[22] Filed: Dec. 18, 1974

[21] Appl. No.: 533,767

[52] U.S. Cl. .............................. 178/69.5 R; 325/321
[51] Int. Cl.² ....................... H04L 5/24; H04L 7/00
[58] Field of Search ............ 178/69.5 R, 53, 53.1 R, 178/89, 88, 68; 179/15 BS, 2 DP; 325/321

[56] References Cited
UNITED STATES PATENTS

| | | | |
|---|---|---|---|
| 3,549,804 | 12/1970 | Greenspan et al. | 178/69.5 R |
| 3,582,789 | 6/1971 | Mick | 178/69.5 R |
| 3,755,748 | 8/1973 | Carlow et al. | 178/69.5 R |
| 3,819,853 | 6/1974 | Stein | 178/69.5 R |

Primary Examiner—Thomas A. Robinson
Attorney, Agent, or Firm—Johnson, Dienner, Emrich & Wagner

[57] ABSTRACT

The data comprises 8-bit words, plus a leading bit as a start bit at a logic one, and a trailing bit for parity, for a total of 10 bits per group. A synchronizing circuit in the receiver selects a proper phase of clock signals for shifting the data bits into a shift register. An enable flip-flop for the synchronizing circuit is set in response to the start bit at the receiver input, and is reset when the start bit appears in the last bit position of the shift register.

In a preferred embodiment, a clock signal is divided into three phases by a delay line. The synchronizing circuit has three flip-flops for selecting the phase when the enable flip-flop becomes set. These flip-flops enable gates for supplying the selected phase to the shift register. Delays are provided from the transmission line to the shift register and enable flip-flop inputs, so that the sampling is centered over each data bit.

18 Claims, 12 Drawing Figures

EXAMPLE OF WORST CASE TIMING DIAGRAM FOR THE RECEIVER OF FIG. 4 WITH $\Delta_1 = 16$ ns, $\Delta_2 = 10$ ns, AND CLOCK ASSIGNMENT (a) OF TABLE 3.

$\Delta = 24$ ns $\pm 1.2$ ns $\Delta/2 = 12$ ns $\pm 1.2$ ns

ORGANIZATION OF A SWITCHING GROUP

SERIAL DATA TRANSFER THROUGH THE NETWORK

ASYNCHRONOUS BIT-SERIAL DATA RECEIVER

BACKGROUND OF THE INVENTION

This invention relates to a receiver for data which is transmitted in asynchronous bit-serial groups.

Data transmission systems have become commonplace, both for transmission between units in locations remote from one another and for transmission between local units in a system. Frequently the data is organized into words of a given number of bits (binary digits) each. The data may be transmitted a word at a time in parallel form, or the bits of each word may be sent serially. The parallel format requires multiple transmission leads and associated apparatus in the senders and receivers. Therefore the bit-serial format is usually considerably less expensive, but there are added engineering complexities.

The transfer of data in serial form through a single communications channel is generally accomplished by using one of two transmission techniques: synchronous or asynchronous transmission. Synchronous data transmission requires that a clock signal (sync word) be transmitted with the data in order to mark the location of the data bits for the receiver. In some systems, the clock signal is sent on a separate lead. There are also systems in which the clock signal is derived from the received data. With asynchronous transmission, a clock signal is not transmitted with the data and the words (characters) need not be contiguous. In order for the receiver to properly recover a message, start and stop elements are added to each data word. The start-stop principle of word synchronization is used in telegraphy and with teletypewriters.

One example of apparatus with data transmission is a digital switching network, such as may be used in a telephone system with pulse code modulation. In one type of arrangement known as a time-space-time network time slot interchangers at the input and output sides use buffer memories to receive data words in various time slots of each frame, and output the words in other time slots. The incoming time slot interchangers receive data words from incoming terminals and supply them to incoming superhighways, and the outgoing time slot interchangers receive data words from outgoing superhighways and output them to outgoing terminals. A space switching stage between the input and output superhighways actuates crosspoint gates in selected time slots to transmit data from an incoming superhighway to an outgoing superhighway.

The transfer of information from an incoming superhighway to an outgoing superhighway requires a finite amount of time due to transmission and switching delays in the network. The uncertainties in the time delays, known as delay variations, cause serious problems in the timing of the digital switching networks. The delay variations in the switching paths of a digital matrix are largely determined by the size of the network, its layout, and the switching device (such as integrated circuits) technology used. To overcome the effects of the delay and timing uncertainties of a network, a "guardspace" of several bits in the transmission rate must be allowed.

Because of the time delay uncertainties and a high speed transmission rate, the data is received asynchronously. Available data receivers are relatively slow.

SUMMARY OF THE INVENTION

An object of this invention is to provide a simple and effective asynchronous bit-serial data receiver capable of operation at a range of speeds; in particular a receiver which may be operated at a very high speed bit rate. The data is in groups of a predetermined number of serial bits at a given bit frequency. The leading bit of each group is a start bit at a logic one state. The receiver includes a shift register with the predetermined number of stages.

According to the invention, the data receiver includes synchronizing apparatus started in response to the start bit of a group to supply clock pulses at the given bit frequency for shifting the data into the shift register, with the phase of the clock pulses selected to sample each bit properly in spite of small variations in the edges of the data bits and clock pulses.

A feature is that the leading bit of each group is used not only as a start bit, but also as a stop bit to stop clock pulses from the synchronizing apparatus when this bit appears in the last stage of the shift register. An enable flip-flop is set by the start bit appearing at the receiver input, and is reset via a connection from the last bit position when it contains a logic one.

In some embodiments of the invention, a clock signal at the given frequency is supplied from a master clock to the synchronizing apparatus, which includes means such as a delay line to split the clock signal into phases. A set of flip-flops is arranged to select one phase when the enable flip-flop is set, and these flip-flops control gates to supply the selected phase to the shift register. In a specific preferred embodiment the clock signal is split into three phases, and three flip-flops are used for phase selection.

In order that the sampling interval may be centered over each data bit to overcome delay uncertainties in the synchronization circuit for higher speed operation, a first delay is provided between the transmission line and the data input of the shift register, and a second delay is provided between the transmission line and the enable input.

An advantage of the data receiver according to the invention is that it is capable of operating at a higher speed than available units. This receiver is also simpler in that the receiving shift register also acts as the word counter for the receiver.

Other objects and features, and the advantages thereof, appear in the following description.

DESCRIPTION OF THE PREFERRED EMBODIMENT

Figure 1:
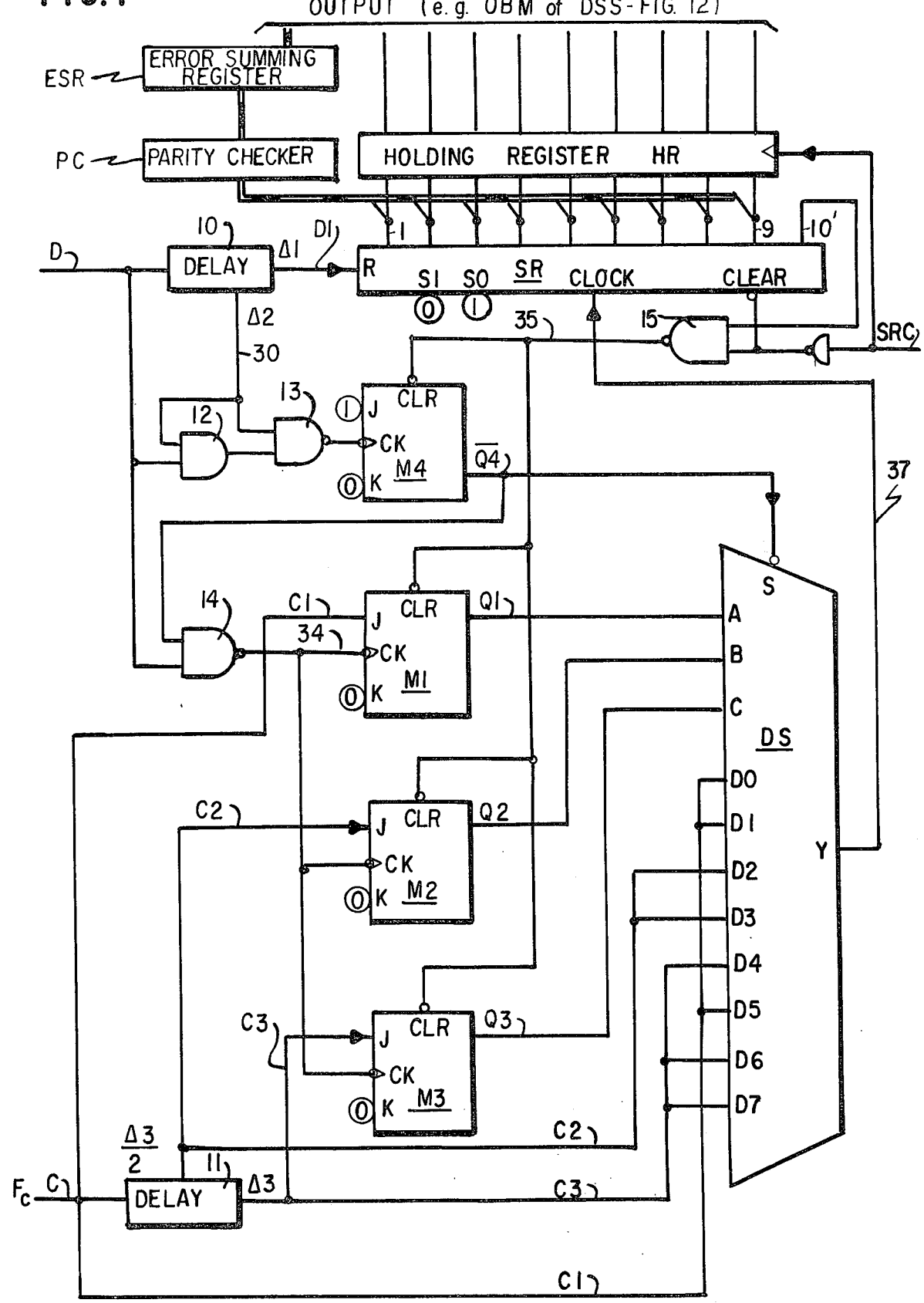
FIG. 1 is a functional block diagram of the preferred embodiment of a data receiver.
Figure 2:
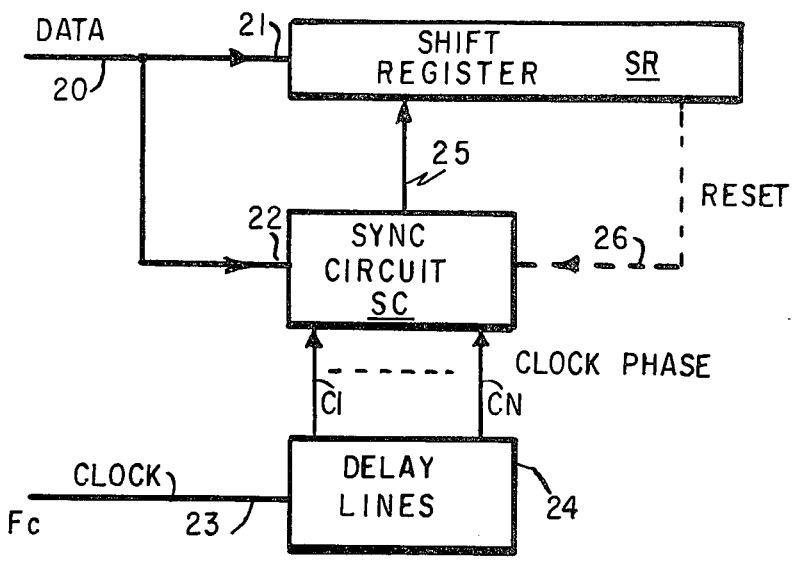
FIG. 2 is a block diagram of the receiver.

A functional diagram of an asynchronous bit-serial receiver employing a three phase clock is shown in FIG. 1. A generalized block diagram employing a polyphase clock is shown in FIG. 2. The receiver basically comprises a shift register SR, and a synchronizing circuit SC. At the arrival of a data word, the synchronizing circuit measures and selects the appropriate clock phase of a polyphase clock for securing the data in the shift register.

With asynchronous transmission, the clock signal is not transmitted with the data and the words (characters) need not be contiguous. In order for the receiver to properly recover a message, the words are of uniform length, and start and stop elements are added to each word. Specifically in this system, each data word comprises ten bits. The leading bit is a logic one used as both a start and a stop bit, the next eight bits are the message word proper, and the last bit is a parity bit. These data words are received over the transmission line designated D in FIG. 1 and 20 in FIG. 2. With this system, the received word could be shorter than the register capacity, in which case the remaining bits would be zeros.

It should be noted that, in order to assure proper recovery of the data when the phase of the receiver clock is unknown at the arrival of the data, the data, particularly high speed data, must be sampled at three or more times the data rate, or be sampled with one phase of a clock having three or more phases. If the data, particularly high speed data, were sampled at the data rate with a clock of unknown phase multiple sampling of some data bits and no sampling of other data bits in a group might result. This problem is particularly crucial at high data rates where the variation in propagation delay through the circuits, and the inequality between rise and fall times in the hardware (such as TTL circuits) is particularly severe. For example at 30.72 megahertz, the delay variation in the sync circuit of the clock is in the order of the bit period (30 nanoseconds. Thus a clock of three or more phases is needed to recover this data. A three phase clock yields sampling margins of T/3 where T is the duration of a data bit. A two-phase clock still would provide no finite sampling margins at very high data speeds.

In the preferred example, the clock signal at a frequency Fc is shown received on lead C in FIG. 1 and lead 23 in FIG. 2. As shown in FIG. 2, a delay line or set of delay lines 24 divides the clock signal into N phases on leads C1-CN. The signal on each of these leads is then at the same frequency Fc, but at a different phase. The leads C1-CN are supplied to the synchronization circuit SC. When a data word is received via line 20, the leading edge of the start bit via path 22 is used to enable the synchronization circuit. A delay may be included in the enabling circuit input. The synchronization circuit then selects one of the clock signal phases from one of the leads C1-CN and gates it via lead 25 to the clock input of the shift register SR.

The data from line 20 via path 21, with a delay if needed, is supplied to the shift register SR and shifted in by the clock pulses from lead 25. When the start bit reaches the tenth position, the output on path 26 may be used in the synchronization circuit SR to stop the train of clock pulses on lead 25.

In the receiver of FIG. 1, a delay line 11 drives a three-phase clock from the input clock signal on lead C. The frequency Fc may by way of example be 30.72 Megahertz. Each clock cycle then has a duration of 32.55 nanoseconds, with a 50% duty cycle. The delay line 11 provides a total delay $\Delta 3$ equal to 22 nanoseconds, and is tapped at point $\Delta 3/2$ for 11 nanoseconds. One phase is the undelayed input signal from lead C to leads C1, a second is from the tap to leads C2 and a third is from the end of delay line 11 to leads C3. The waveforms are shown on FIG. 3 at the top.

The synchronization circuit comprises phase-selection flip-flops M1, M2, M3, an enable flip-flop M4, a data selector DS, and gates 12-15. The flip-flops may be JK type 74S112, the data selector DS may be type 74S151, and the shift register SR may be type 74S194, all available from Texas Instruments, Incorporated.

The clock phase leads C1, C2, C3 are connected to the J inputs of flip-flops M1, M2, M3 respectively. The K inputs of these three flip-flops are at logic zero.

Figure 3:
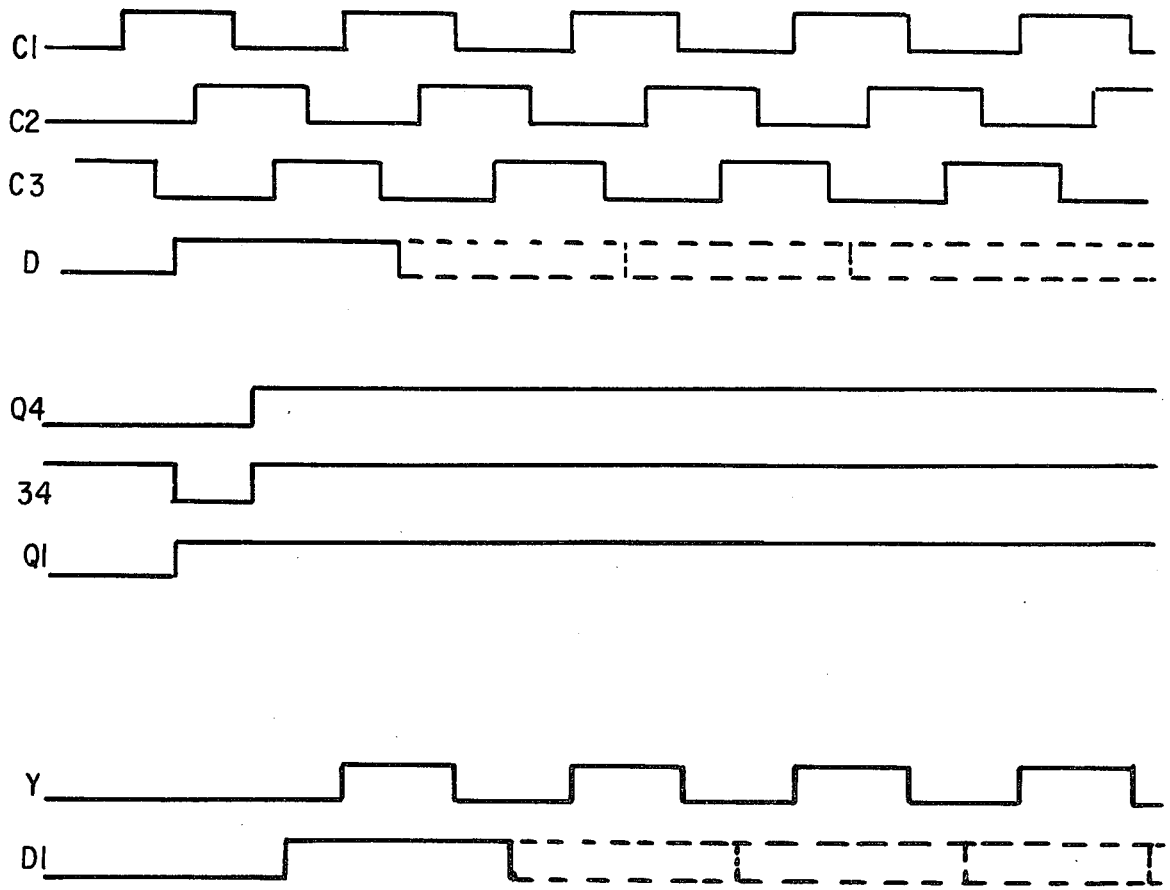
FIG. 3 is a timing diagram of the receiver of FIG. 1.

As the arrival time of the data is uncertain, the synchronization circuit is needed to select the clock phase appropriate for securing the data in the shift register. At the arrival of the start bit of the data word, the states of the three clock phases C1, C2, C3 are measured by flip-flops M1, M2, M3 respectively and determine the clock phase to be selected by the data selector DS. The clock input for flip-flops M1, M2, M3 is supplied via NAND gate 14 and lead 34. A negative going transition of the signal at the CK inputs clocks in signals at the J and K inputs. Normally between data words received the synchronization circuit is reset with all of the flip-flops having a logic zero at the Q outputs and a logic one at the $\overline{Q}$ outputs. (With slower D type flip-flops the reset is not needed) Gate 14 normally has a logic one at its input port from lead $\overline{Q4}$ from flip-flop M4, and a logic zero at its input port from the date line D, so that its output is a logic one or high. The arrival of the start bit changes the lower input port of gate 14 to a logic one, so that the output on lead 34 goes to logic zero or low. This negative going transition clocks the flip-flops M1, M2, M3 so that those having logic one signals at the J inputs become set. This effectively measures the states of the clock phases. For examaple, if the data arrives as shown at graph D in FIG. 3, flip-flop M1 is set, while flip-flops M2 and M3 remain reset. The output from flip-flop M1 at lead Q1 is shown in FIG. 3, graph Q1.

The data sampling interval is centered over each data bit by providing a delay $\Delta 1$ for the data and a delay $\Delta 2$ for the clock-enable. These delays are obtained from a delay line 10, with $\Delta 2$ from a tap and $\Delta 1$ at the end. This helps to overcome the problem of proper sampling at the 30.72 megahertz frequency, with the delay uncertainties in the synchronization circuit. (At lower frequencies no delay lines are needed).

The signal from tap $\Delta 2$ of delay line 10 via path 30 is used to set the enable flip-flop M4. To prevent noise spikes of less than 12 nanoseconds duration (other widths could be chosen) from triggering the receiver, a glitch filter has been added. It consists of the delay $\Delta 2$ and the additional gate 12. When a start bit of proper duration arrives at the tap $\Delta 2$, the upper input ports of gates 12 and 13 are at logic one. The lower input port of gate 12 is also at logic one from the data line D, so that the lower input port of gate 13 is also a logic one. This produces a negative going transition at the output of gate 13 to set flip-flop M4. Note that the J and K inputs are fixed at logic one and zero respectively. The signal on lead $\overline{Q4}$ inhibits gate 14 to terminate the clock signal on path 34. The signal from flip-flop M4 on lead $\overline{Q4}$ enables the data selector Ds.

In the data selector DS, the input ports A, B, C, with weights 1, 2, 4 respectively, are used to select one of the eight signal ports D0-D7. With a logic zero at port S, the signal at the selected one of the ports D0-D7 is gated to output port Y. The selected signal is one of the clock phases C1, C2 or C3. With the example shown in FIG. 3, the port D1 for clock phase C1 is selected, as shown by graph Y.

The shift register SR has the data input via path D1 from delay line 10 connected to the shift right input port R. The shift register has other ports, not shown, which should have fixed termination potentials as required for shift right operation. The clock signals from port Y of the data selector DS via path 37 are supplied to port CLOCK. The delayed input data is shown by graph D1 in FIG. 3. The data is entered and shifted on the rising edge of the clock pulses.

As the start bit, always a logic one, is shifted into the tenth bit position (overflow position) of the shift register, the signal from putput port $10^1$, inverted via NAND gate 15 and path 35 resets the enable flip-flop M4, and also the flip-flops M1, M2, M3. With the flip-flop M4 reset, the signal on lead $\overline{Q4}$ becomes logic one to inhibit the data selector DS via port S, to thereby stop the clock pulses to the shift register SR. As long as the output port 10' is at logic one, path 35 is held at logic zero which prevents setting flip-flop M4 or any of the other flip-flops.

After the data from the shift register SR is taken via output ports 1-9 and placed in the holding register HR, a clear signal at a logic one is supplied via path SRC to clear the shift register SR, resetting all positions to logic zero. The enable flip-flop M4 is no longer held in the clear state, and the receiver is ready to receive a new data word.

As optimization of the sampling margins for the data is the ultimate goal in the design of an asynchronous bitserial receiver, the proper assignment of the clock phases to the clock states is paramount to the operation of the receiver. The optimum assignment depends on the delays Δ1 and Δ2 and the integrated circuit components used. As stated above, the components comprise 74S112 flip-flops, a 74S151 data selector and a shift register with type 74S194 units. There are various possible combinations for the delay times and flip-flop states for clock phase assignment. The delay times chosen are Δ1 = 16 nanoseconds, Δ2 = 12 nanoseconds, Δ3 = 22 nanoseconds, each with a tolerance of plus or minus 1.2 nanoseconds. The clock assignment is shown in Table 1.

TABLE 1

| M1 | M2 | M3 | Clock Assignment Decoded | Selected Clock |
|---|---|---|---|---|
| 1 | 0 | 1 | D5 | C1 |
| 1 | 0 | 0 | D1 | C1 |
| 1 | 1 | 0 | D3 | C2 |
| 0 | 1 | 0 | D2 | C2 |
| 0 | 1 | 1 | D6 | C3 |
| 0 | 0 | 1 | D4 | C3 |
| 0 | 0 | 0 | D0 | C1* |
| 1 | 1 | 1 | D7 | C3* |

Theoretically, the three-phase clock can assume one of the six states D1-D6. The states 000 (D0), and 111 (D7) are excluded. However, due to component tolerances, there exists a remote chance that the synchronization circuit may be trapped in one of those two states. To eliminate this problem, the clock phases are assigned to these two states as indicated by * in Table 1.

Alternative Embodiments

Receiver With Four-Phase Selection

Figure 4:
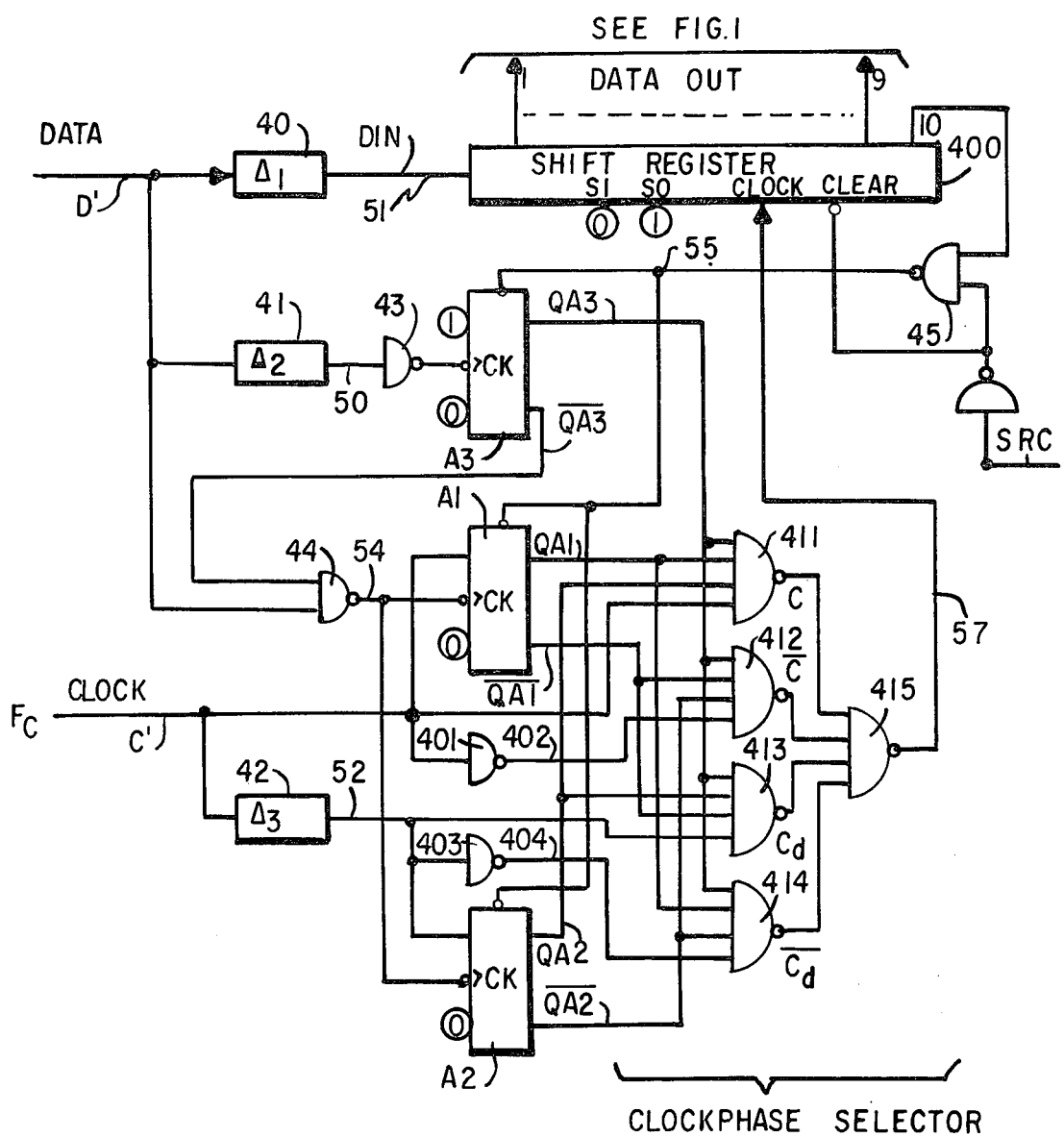
FIG. 4 is a functional block diagram of another embodiment for the block diagram of FIG. 2.

In FIG. 4 there is shown a receiver circuit similar to that of FIG. 1, except that the clock is divided into four phases, with a simpler circuit. A four-phase clock is equivalent to a system of two primary clocks in quadrature, each primary clock also having a complementary output. The input clock signal on path C' may be considered a first clock signal, and via inverter 401 the complement appears at path 402. With the 30.72 megahertz frequency Fc for the input clock signal, the duration of a data bit is a little over 32 namoseconds. A delay line 42 with a delay Δ3 of 8 nanoseconds has its input from path C', and from its output provides a second clock signal at path 52. Its complement via inverter 403 appears at path 404.

The receiver comprises a 10-bit shift register 400 and a synchronization circuit. The synchronization circuit comprises two flip-flops A1, A2 to measure the states of the clocks and an enable flip-flop A3 to start and to stop the clock to the shift register. The decoded clock states determine the selected clock phase to secure the data in the shift register. A delay line 40 provides a delay Δ1 from the input data line D' to the shift register input via path 51. A delay line 41 provides a delay Δ2 between the data line D' and path 50 for triggering the flip-flop A3. The delay Δ2 is required to prevent repeated sampling of the start bit, due to delay variations in the circuit.

Figure 5:
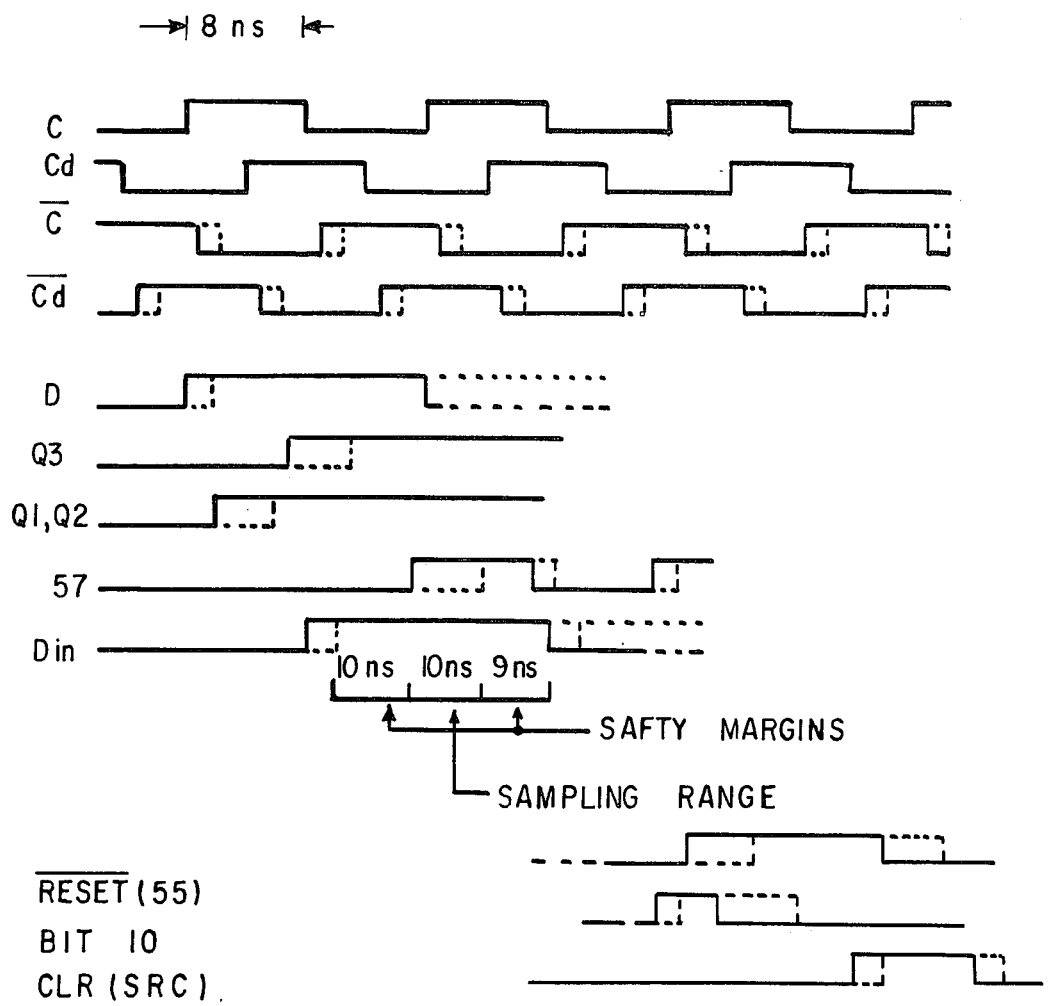
FIG. 5 is a timing diagram thereof.

Typical operation is illustrated by a timing diagram in FIG. 5. At the arrival of a start bit (lead bit) of a data word, the flip-flops A1, A2 measure the states of the clock C and delayed clock Cd. The J inputs are connected to the clock signal path C' and the tive going trigger is supplied to the clock inputs from lead D' inverted via gate 44 to path 54. The enable flip-flop A3 is set by the signal on path D', delayed in delay line 41 and inverted by gate 43. The output on path $\overline{QA3}$ becomes a logic zero to inhibit gate 44 and end the trigger pulse. The output on path QA3 is now a logic one to enable gates 411-414.

The measured clock states are decoded at gates 411-414 to select one of the four clock phases C, $\overline{C}$, Cd and $\overline{Cd}$. FIG. 5 shows phase Cd selected. Therefore the clock signal on path 404 is gated via gates 414 and 415 to path 57 for supplying clock pulses to the shift register 400. The data to the shift register is delayed by Δ1 nanoseconds to ensure proper sampling of each data bit.

As the lead bit, always a logic one, is shifted into the tenth bit position (overflow position) of the shift register, the enable flip-flop A3 is reset via inverter 45 and path 55. This inhibits gates 411-414 to stop the clock signals to the shift register. The start bit also serves as a stop bit after the data is secured in the shift register 400.

After the data out is taken, the system supplies a clear signal on lead SRC to clear the shift register 400 and flip-flops A1 and A2. The enable flip-flop is no longer held in its reset state, and the receiver is ready to receive a new data word.

The assignment of the clock phases to the states of the clock signals measured at the arrival of a data character is not unique. The assignment depends upon the time delays in the circuit and the delays $\Delta 1$ and $\Delta 2$. Two possible assignments are shown in Table 3.

TABLE 3

(a) Delays: $\Delta_1 = 16$ns, $\Delta_2 = 10$ns, $\Delta_3$ 32 8ns (10–13ns)

| Measured Clock States | | Assigned Clock Phase |
|---|---|---|
| A1 | A2 | |
| 1 | 0 | $C_d$ |
| 1 | 1 | C |
| 0 | 1 | $C_d$ |
| 0 | 0 | |

(b) Delays: $\Delta_1 = 20$ns, $\Delta_2 = 10$ns, $\Delta_3 = 8$ns (not critical)

| Measured Clock States | | Assigned Clock Phase |
|---|---|---|
| 1 | 0 | C |
| 1 | 1 | $C_d$ |
| 0 | 1 | C |
| 0 | 0 | $C_d$ |

Clock Phase Assignment as a Function of Delays $\Delta_1$ and $\Delta_2$, and Measured Clock States at the Arrival of the Data Character.

The timing diagram for the receiver, assuming the clock assignment (a) of Table 3 is shown in FIG. 5. Safety margins of T/4 nanoseconds in the sampling of the data bits are achieved, where T is the duration of a data bit.

The components for this receiver may be three 74S194 units for the shift register 400, type 74S112 flip-flops, one type 74S00 chip for 2-input gates, three 74S20 chips for 4-input gates (or a selector type 74S151) and three delay lines.

Receiver Deriving Clock From Triple Speed Clock

Figure 6:
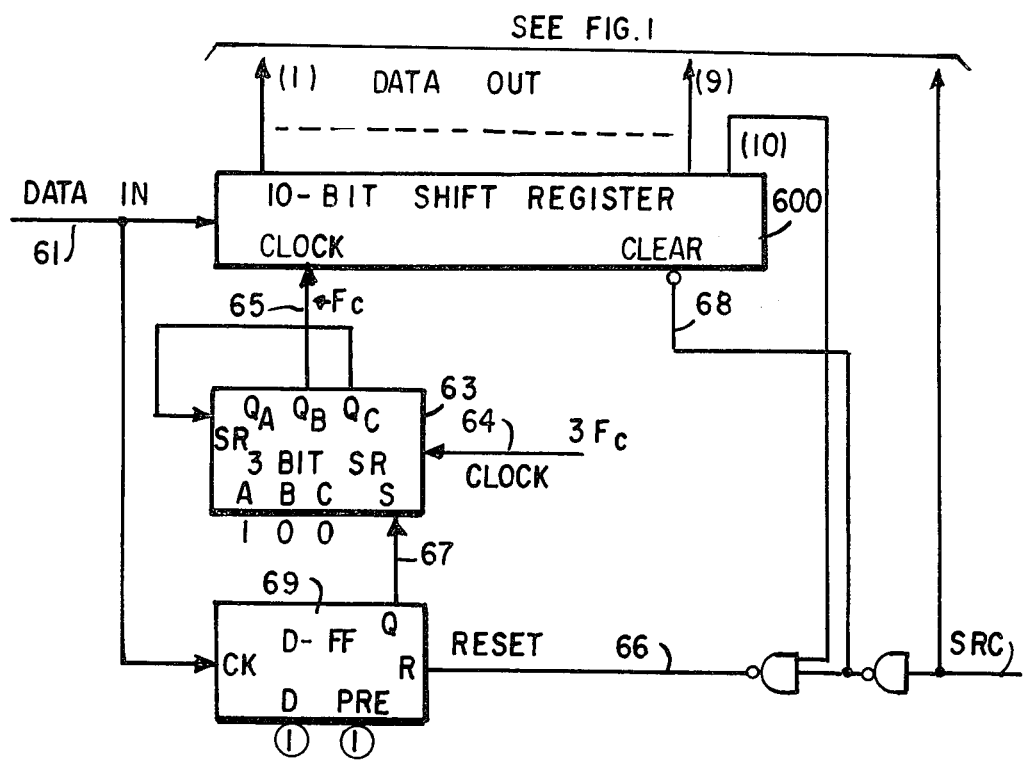
FIGS. 6 and 8 are functional block diagrams of other embodiments of the receiver.

The receiver shown in FIG. 6 also comprises a 10-bit shift register 600 and a synchronization circuit. The synchronization circuit basically comprises a D flip-flop 69 and a 3-bit shift register 63. The 3-bit shift register 63 makes use of two modes of operation, right shift and parallel load. In the parallel load mode, a fixed 100 is loaded as indicated in FIG. 6. In the shift mode the contents are circulated to the right with each pulse of the input clock signal on path 64, which is at a frequency three times Fc. The clock pulses to the 10-bit shift register 600 are taken from the center output QB of the 3-bit shift register 63 via path 65, which occur at the frequency Fc.

Figure 7:
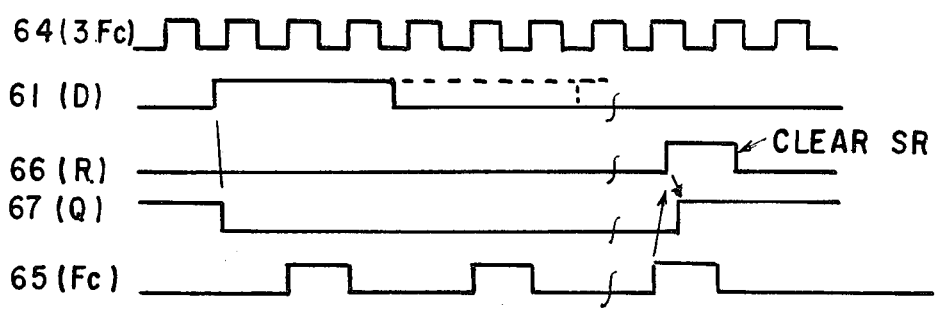
FIGS. 7 and 9 are respective timing diagrams thereof.

The data words, as before, comprise ten bits, with the leading bit being a start bit which is always a logic one. The timing diagram is shown in FIG. 7.

As to the operation, the start bit sets flip-flop 69 (if the signal at the reset port R is a logic one). The output of flip-flop 69 via lead 67 enables the right shift (circulate) of the 3-bit shift register 63. Note that lead 67 is connected to record the output ($Q_B$) of the circulating shift register 63. This results in a delay of one clock period of the 3Fc clock or ⅓of the data bit duration needed to center the data. Shift register 63 is clocked by pulses from path 64 at the frequency 3 Fc. Its output in turn via lead 65 clocks the 10-bit shift register 600 receiving the information word.

With the arrival of the last information bit, the 10-bit shift register 600 overflows with start bit into the tenth position. The tenth bit resets flip-flop 69 via path 66, and in turn it inhibits the 3-bit shift register via path 67, placing it in the parallel load mode. The clock signals to the 10-bit shift register 600 are thus removed.

After reading the contents of the shift register 600, it is cleared via a signal on lead 68.

In this receiver delay lines could be inserted from the data input line 61, to the 10-bit shift register 600 shift right input, and also to the clock input of the flip-flop 69.

Receiver with Gated, Free-Running Oscillator

Figure 8:
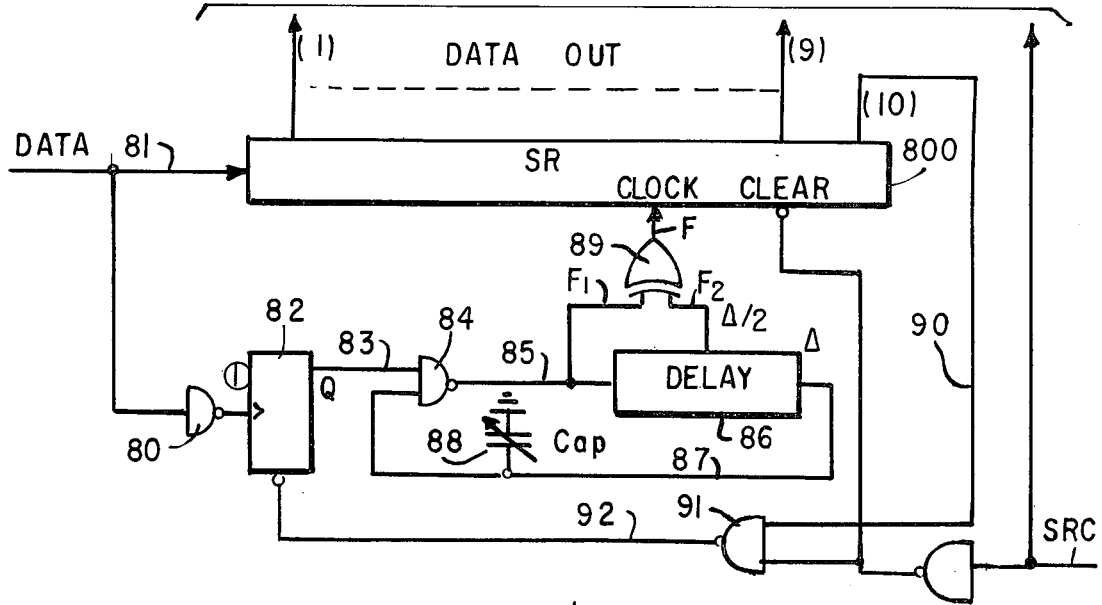
Figure 9:
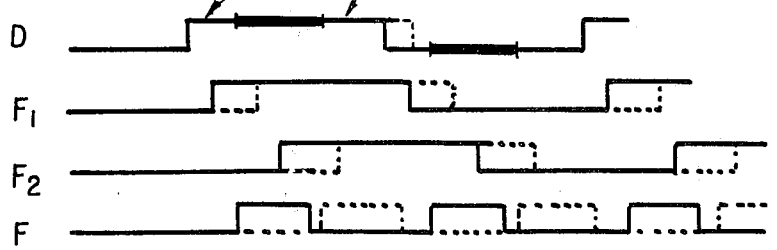

A receiver employing a gated, free-running oscillator is shown in FIG. 8. This receiver essentially consists of a ten-bit shift register 800 for data reception and storage and a gated square wave oscillator. The square wave oscillator consists of a single inverting gate 84 and a 32.55 ns delay loop (equal to the period of the 30.72 MHz clock). The delay loop is implemented by means of a fixed delay line 86 of 24 ns and a variable delay. The latter is realized by an RC timeconstant. At the arrival of the start bit of a data word, the oscillator is enabled generating the 30.72 MHz clock to the shift register. The capacitor 88 in the loop is variable for adjusting the loop delay. This capacitor 88 is charged through the collector resistor of the inverting gate 84 (pull-up transistor) and discharged through the saturation resistance of the inverting gate 84 (pull-down transistor). The actual clock waveform is derived by exclusive-oring the tap-output of the delay line with its undelayed input as illustrated in FIG. 9. Thus the signal on lead F1 is from the input to the delay line, and the signal on lead F2 is from the tap $\Delta/2$. These are combined via exclusive OR gate 89 with output via lead F to the clock input of the shift register 800.

The enabling of the synchronization circuit is accomplished by setting flip-flop 82 at the leading edge of the start bit via an inverter 80. The flip-flop output to path 83 enables gate 84.

When the start bit reaches the tenth bit position of shift register 800, the signal on path 90 via NOR gate 91 resets the flip-flop 82.

After the data is read out of the shift register 800, a signal on lead SRC is used to clear it for the next data word.

While this receiver has a very simple circuit, the oscillator being free-running, it must be very stable; that is, all component values must be controlled tightly, the supply voltage must be stabilized, the circuit must be temperature compensated, and care must be taken in tuning the delay loop to the frequency of operation. Therefore the maximum frequency for dependable operation is much lower than that of the receiver of FIG. 1.

DESCRIPTION OF A DIGITAL SWITCHING SYSTEM (DSS)

Figure 10:
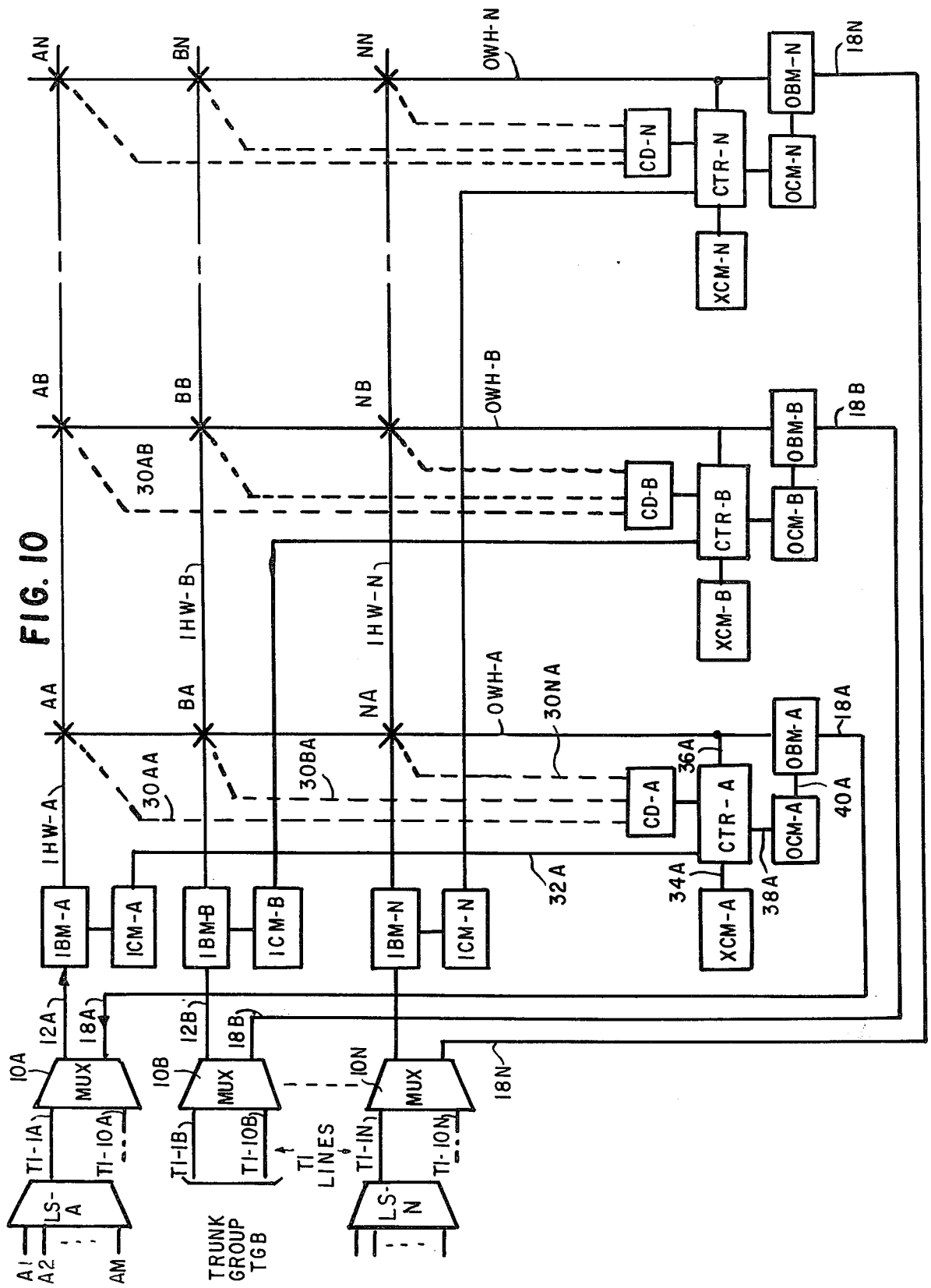
FIG. 10 is a block diagram of a telephone switching system.

FIG. 10 illustrates a digital communication switching system, more particularly a pulse code modulation time division multiplexed telephone system, including the preferred embodiment of the invention. A digital switching matrix is a time-space-time (TST) connecting network. The first and last digits are realized by full-availability time slot interchangers (TSI). The center stage is a time-division space stage. The square array of cross points is partitioned into vertical columns of N X I cross points, N being the number of superhighways of the network. The matrix is divided into switch groups on a superhighway basis, with each switch group having its own controller. For example, switch group A comprises an input time slot interchanger comprising an input buffer memory IBM-A connnected to superhighway IHW-A and a control memory ICM-A; an output time slot interchanger comprising an output buffer memory OBM-A, and a control memory OCM-A. Switch group A also includes the vertical column of cross points AA, BA to NA inclusive with inputs from the superhighways of the several switch groups, and an output to the output buffer memory OBM-A. The switch group A has its own individual controller CTR-A. The crosspoints have an associated control memory XCM-A, and a crosspoint decoder CD-A. The decoder CD-A enables the crosspoints in selected time slots via the lines 30AA, 30BA to 30NA inclusive. Similarly switch group B comprises an input time slot interchanger with memories IBM-B and ICM-B, a vertical column of cross points AB, BB to NB inclusive, and an output time slot interchanger comprising memories OBM-B and OCM-B, along with its controller CTR-B, a crosspoint control memory XCM-B and a crosspoint decoder CD-B. The other switch groups are similarly organized up to the including switch group N. Each switch group also includes address counters (not shown) for the input and output time slot interchangers.

Each switching group has a multiplexer shown as 10A for Group A, and 10B to 10N for the other groups. It might, for example, combine the channels from ten T1 lines T1-1 to T1-10, each of these T1 lines having an incoming pair and an outgoing pair as shown. Each of the T1 lines multiplexes twenty-four channels, making a total of 240 channels served by a switch group.

The T1 lines may connect to various equipment such as remote line switches LS-A to LS-N, to trunks such as trunk group TGB, and to the central processor PRO, as well as other devices in the central office.

The may, switches are shown as having T1 lines connected to the multiplexer of the same group. The line switches are shown as single units, but each line switch may in fact, comprise a group of units with the T1 lines extending through them in a series loop, each unit serving a group of subscriber lines. Line switch LS-A is shown as connected to subscriber lines A1, A2, and so forth up to line AM. Both calling and called lines of a line switch are assigned to channels of the T1 lines for the duration of a call.

As described above with reference to FIG. 10, a digital switching matrix is organized in digital switch groups. Each switch group is assigned its own controller CTR. A digital switch group may for example consist of 32 switch groups. The work of the 32 controllers is coordinated by the processor PRO (not shown). Network timing is derived from the system clock (not shown) and data transfer clock (not shown).

The system clock is a stable clock and operates at 2.048 MHZ. It controls all path switching operations, that is, it controls the read/write operations of all time slot interchanger (TSI) memories and the crosspoint control memories XCM-A to XCM-N.

The transfer clock may operate at 30.72 MHZ or a higher frequency. It controls the bit-serial transfer of data (speech) from an incoming time slot interchanger via a crosspoint to an outgoing time slot interchanger.

The digital switching matrix may be viewed as having two modes of operations; a synchronous mode of operation, also called Network Control Mode, and an asynchronous mode of operation, referred to as Call Process Mode.

In the Network Control Mode, the Call path switching operations and the bit-serial data transfer are performed. In the Call Process Mode, the call processing functions such as device selection, digit reception and outpulsing, idle path selection, loading of all path control memories and marker functions are executed. In this mode of operation, the switching group controllers have access to the path control memories via the control access circuit CAC (FIG. 11).

Figure 11:
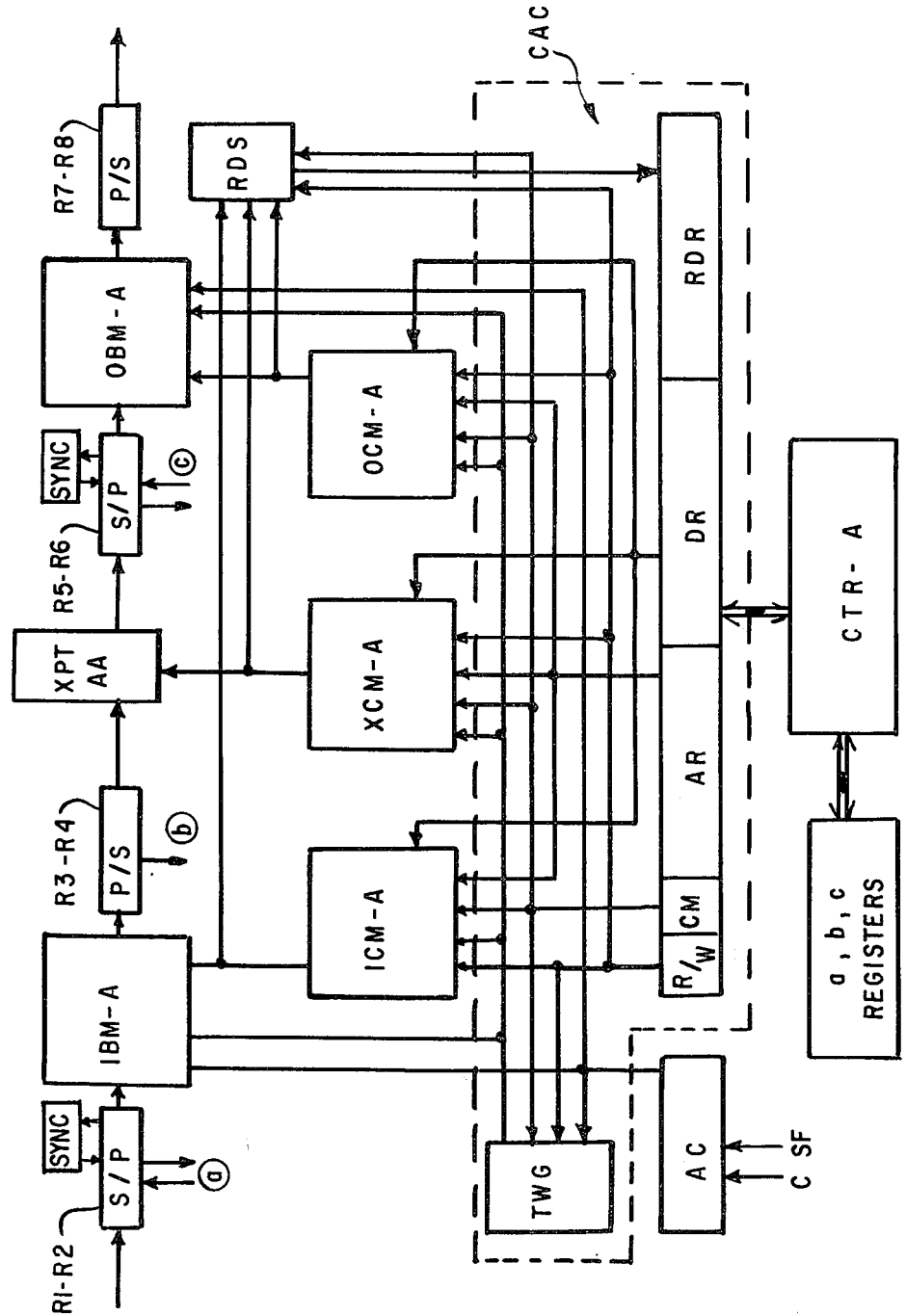
FIG. 11 is a block diagram showing the organization of one switching group of the system of FIG. 10, adding a control access circuit.

The operation and control of the digital switching matrix is best explained and understood by examining the organization of a single switch group, as shown in FIG. 11 for Group A.

In the Call Process Mode, the switch-group controller CTR-A has access to the control memories of the switch group via the control access circuit CAC simply by addressing the control access circuit as illustrated in FIG. 11. The control access circuit CAC consists essentially of an address register AR, a data register DR, a return-data registrater RDR and a time-window generator TWG.

The controller CTR-A may address the control access circuit CAC via its input/output bus. This bus may by way of example consist of ten address bits (two bits for control memory selection, eight bits for address selection), nine data bits, nine return-data bits, and two bits for read/write commands (10/01) and possibly one DO command. The total input/output bus thus has 30 or 31 bits.

The control access circuit CAC isolates the synchronous operation of the switching matrix and the asynchronous operation of the controller CTR may address the control access circuit CAC at any time, but the instruction is latched in the control access circuit registers until the timing window generated TWG opens the control access cycle of the time slot. An instruction must be present prior to the start of the control access cycle, otherwise the execution of the instruction is deferred to the next control access cycle (one time slot later). After the successful execution of the instruction the control access circuit CAC sets a DONE flag ($\overline{DO}$) to the controller CTR.

Figure 12:
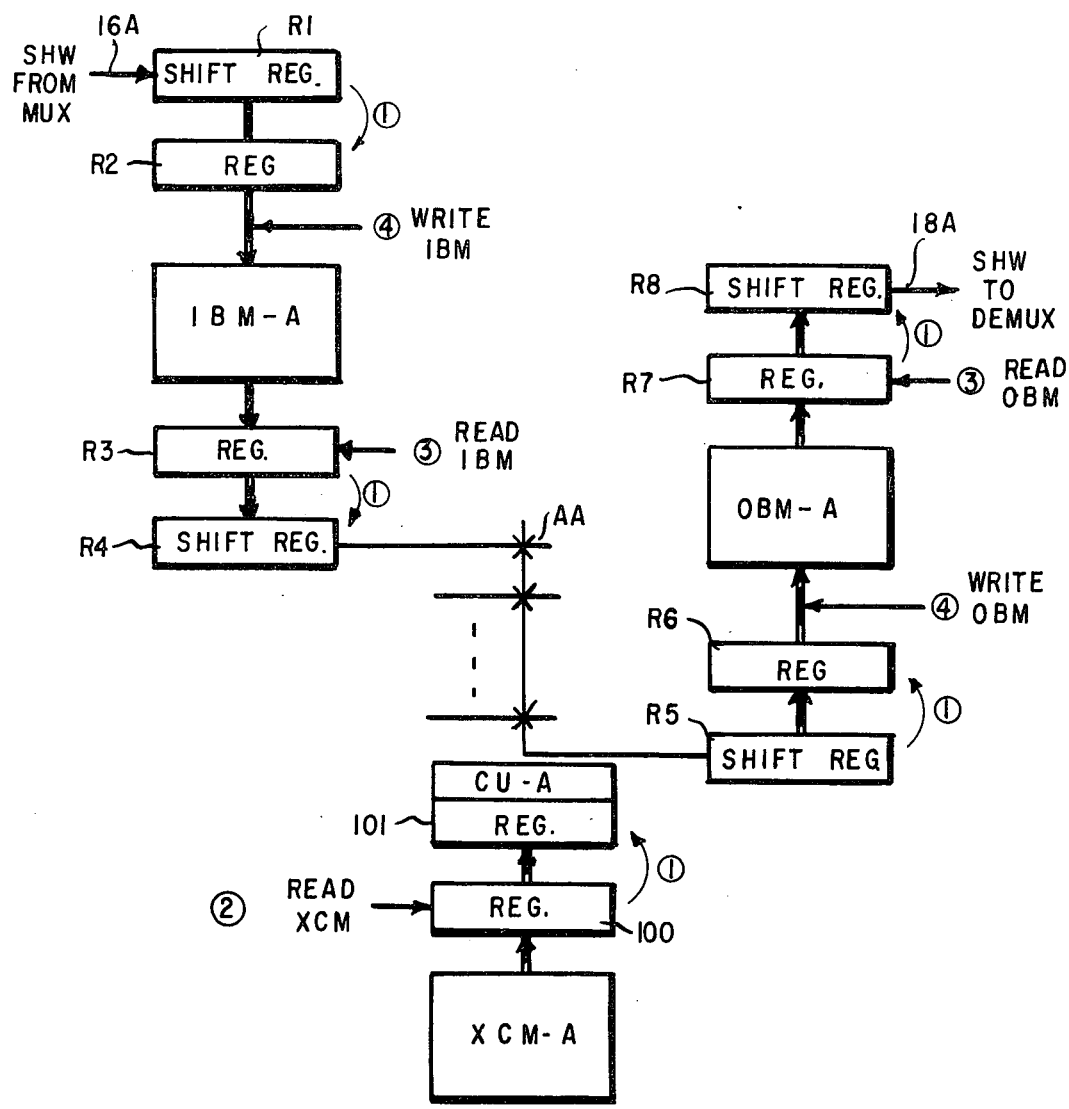
FIG. 12 is a diagram for showing data transfer via a path through the switching network of FIG. 10.

The transfer of information from incoming time slot interchanger A to outgoing time slot interchanger A via cross-point AA is shown in FIG. 12. In addition to the time slot interchanger data stores IBM-A and OBM-A, there are dual rail parallel/ serial and serial/parallel converters with synchronization circuit, these dual rail converters are R1-R2, Re-R4, R5-R6 and R7-R8.

Data are shifted from the upper rail register into the lower rail register during the control memory read cycle. The start of the data transfer is coincident with the reading of the data stores. The time of the serial/-parallel and parallel/ serial converters from and to the multiplexors is included in the timing scheme. The operations indicated by the same number in a circle are executed during the same cycle.

These cycles are arranged as shown in Table 4 as (1) increment address counters and shift data from upper rail registers to lower rail registers in FIG. 12, (2) read all control memories, (3) read all data memories and (4) write all data memories. There is a transfer delay of two time slots. In Table 4, the stacking of the control cycles is shown.

TABLE 4

| | Stacked Control Cycles | | | |
|---|---|---|---|---|
| | CYCLE 1 | CYCLE 2 | CYCLE 3 | CYCLE 4 |
| Network Control | Increment AC | Read ICM | Read IBM | Write IBM |

TABLE 4-continued

| | Stacked Control Cycles | | |
|---|---|---|---|
| | CYCLE 1 | CYCLE 2 | CYCLE 3 | CYCLE 4 |
| Mode | | OCM XCM | OBM | OBM |
| Call Process Mode | Read/Write all memories | | | |

As shown in FIG. 12, a parallel register and a shift register is used for each serial-to-parallel and parallel-to-serial converter so that an entire time slot of 488 nanoseconds can be used to perform the serial transfer from register R4 to register R5. All transfers between parallel registers and shift registers takes place at the start of Cycle (1). All serial transfers then begin at the start of Cycle (1) and complete at the end of Cycle (4). There is fixed delay of two time slots from the time that input buffer memory IBM-A is read until the data is written into the output buffer memory OBM-A.

The progress of one data (speech) word through the matrix will now be traced. Data from the multiplexer 10A (FIG. 10) is serially transferred via leads 12A and 16A into register R1 during the 488 nanoseconds of one time slot. In the next time slot during cycle (1), data from the shift register is transferred to the parallel register R2 to prepare for writing into the input buffer memory IBM-A. The data is held in this parallel register during the entire time slot, and written into the input buffer memory IBM-A during cycle (4). This word does not proceed further through the matrix until the occurrence of the time slot assigned to this call as stored in the control memories.

Next the data is transferred through the space switch from the incoming time slot interchange to the outgoing time slot interchanger. The control memories are read during Cycle (2) using the contents from the address counter AC for the addresses. The result from control memory ICM-A is used as the address for reading memory IBM-A in Cycle (3). The data read from memory IBM-A is held in parallel register R3 to initiate the serial transfer through the crosspoint AA. At the start of Cycle (1) of the next time slot, the data is transferred into register R4, and the word read from memory XCM into a register 100 is loaded into a register 101 that drives the crosspoint decoder CD-A to close the proper crosspoint AA. The serial transfer then takes place during the entire time slot (all 4 cycles), from register R4 into register R5. At the start of the next cycle (1), the data is gated from the receive serial shift register R5 to a parallel register R6. During Cycle (4) of this time slot the parallel register is written into the output buffer memory OBM-A.

There is a fixed delay of two time slots from the time that the memory IBM-A is read until the data is written into memory OBM-A, and the address counter AC has been incremented by two. Thus if the same address counter is used for an entire switching group, the data is written into memory OBM-A at an address two locations past the address corresponding to the time slot in which the data was sent from the incoming time slot interchanger through the switch. Thus the controller CTR-A should add two to the switch time slot number before writing it into memory OCM-A in setting up a network path.

Next the data is transferred from the outgoing time slot interchanger to the multiplexer 10A. The control memory OCM-A is read during cycle (2). The word read from memory OCM-A is used as the address for reading memory OBM-A into parallel register R7 during Cycle (3). At the start of Cycle (1) in the next time slot the data is transferred from the parallel register R7 to a shift register R8 to initiate the serial transfer to the multiplexer 10A via line 18A. The serial transfer proceeds for the entire time slot and the data is transferred into a parallel register in the multiplexer at the start of the next cycle (1). The data can then be used by the multiplexer any time during the next time slot.

It may be noted that the only operpation to occur in Cycle (1) that is associated with the cylindrical time slot interchanger operation is to increment the address counter AC. No cyclical time slot interchanger operations occur during Cycle (1). Thus, this cycle is available for the controller CTR-A to gain random access to all of the time slot interchanger memories.

Two or Three Cycle Embodiments

While a four-cycle arrangement has been described above, it should be noted that two or three cycle embodiments are also possible, and have the advantage that slower memories may be used.

I claim:

1. A data receiver for receiving data from a data line, said data being in asynchronous bit serial form at a predetermined bit frequency in groups of N bits, the leading bit of each group being a start bit of one logic state; said data receiver comprising an N-stage shift register operative to clock data in from said data line under the control of said leading bit and synchronizing means, both said register and said synchronizing means being coupled to said data line, and with a clock connection from said synchronizing means to said shift register; means responsive to said leading bit to start said synchronizing means in order to select a phase relation to supply a train of clock pulses to said shift register at said given bit frequency via said clock connection in order to shift one of said groups from said data line into said shift register in accordance with the phase relation selected.

2. A data receiver as set forth in claim 1, further including means responsive to said one logic state indicating said leading bit in the Nth stage of said shift register to stop said synchronizing means.

3. A data receiver as set forth in claim 1, further including delay means, clock input means connected to supply clock signals at said predetermined frequency to said delay means, a given number of clock conductors from said clock input means and said delay means connected to supply clock signals on said clock conductors at different phases at said predetermined frequency.

4. A data receiver as set forth in claim 3, wherein said synchronizing means comprises phase select bistable devices with input connections from said data line and said clock conductors to trigger and selectively set said phase select bistable devices in response to said start bit in accordance with the clock signals then on said clock conductors, and gate means selectively enabled by output connections from said phase select bistable devices to connect one of said clock conductors to said clock connections.

5. A data receiver as set forth in claim 4, wherein there are three of said clock conductors for clock signals of three phases, and there are three of said phase select bistable devices.

6. A data receiver as set forth in claim 5, wherein there are four of said clock conductors for clock signals of four phases, and there are two of said phase select bistable devices which may be set in four different combinations for selection respectively from among said four phases.

7. A data receiver for receiving data from a data line, said date comprising groups of N bits in asynchronous bitserial binary form at a predetermined frequency, the leading bit of each group being a start bit which is a logic one, there being a guard interval between groups;
  said data receiver comprising a shift register, synchronizing means, enable means and reset means;
  said shift register comprising N bit positions, a data input coupled to said data line, a clock connection from said synchronizing means for clock pulses to shift said data received at said data input from the first to the Nth of said bit positions;
  said enable means comprising a bistable device having a set input coupled to said data lead and an enable connection to said synchronizing means, operative in response to said leading bit at said input to set said enable means and in response thereto to supply an enable signal via said enable connection;
  said synchronizing means comprising means operative in response to an enable signal on said enable connection to supply a train of clock pulses via said clock connection, including phase control means to synchronize said train of clock pulses to be in phase with said data for each group;
  said reset means comprising means to reset said enable means and thereby terminate said train of clock pulses on said clock connection.

8. A data receiver as set forth in claim 7, wherein said reset means includes a reset connection from said Nth bit position to said enable means, operative in response to a logic one indicating said leading bit in said Nth bit position to supply a reset signal on said reset connection to reset said enable means.

9. A data receiver as set forth in claim 7, wherein said phase control means comprises phase select bistable devices with input connections from said data line on said clock conductors to trigger and selectively set said phase select bistable devices in response to said leading bit in accordance with the clock signals then on said clock conductors, and gate means selectively enabled by output connections from said phase select bistable devices to connect one of said clock conductors to said clock connection.

10. A data receiver as set forth in claim 9, further including delay means, clock input means connected to supply clock signals at said predetermined frequency to said delay means, a given number of clock conductors from said clock input means and said delay means connected to supply clock means on said clock conductors at different phases at said predetermined frequency.

11. A data receiver as set forth in claim 10, wherein there are four of said clock conductors for clock signals of four phases, and there are two of said phase select bistable devices which may be set in four different combinations for selection respectively from among said four phases.

12. A data receiver as set forth in claim 10, wherein there are three of said clock conductors for clock signals of three phases, and there are three of said phase select bistable devices, with said clock conductors connected respectively to individual ones of said phase select bistable devices, so that with 50% duty cycle of said clock signals, in response to said start bit one or two of said phase select bistable devices become set, and of the resulting six combinations for setting said phase select bistable devices, two are assigned for selection of each of said clock conductors via said gate means.

13. A data receiver as set forth in claim 12, wherein the two combinations of all of said phase select bistable devices being in the same state, which should not normally occur when said synchronization circuit is enabled, are also each assigned for selection of one of said clock conductors via said gate means.

14. A data receiver as set forth in claim 12, further including input delay means connected from said data line to said data input of said shift register for one delay time, and also to said set input of said enable means for another delay time, so that the clock pulses on said clock connection to said shift register are aligned with said bits of said data for proper shifting into said shift register.

15. A data receiver as set forth in claim 14, wherein said reset means includes a reset connection from said Nth bit position to said enable means, operative in response to a logic one indicating said leading bit in said Nth bit position to supply a reset signal on reset connection to reset said enable means, said reset connection also being connected to reset said phase select bistable devices.

16. A data receiver as set forth in claim 7, further including input delay means connected from said data line to said data input of said shift register to provide a delay time for said data, so that the clock pulses on said clock connection to said shift register are aligned with said bits of said data for proper shifting into said shift register.

17. A data receiver as set forth in claim 16, wherein said input delay means also is connected to provide a delay from said input data line to said set input of said enable means.

18. A data receiver as set forth in claim 7, wherein said synchronization circuit comprises a three-bit shift register, means to parallel load said three-bit shift register with a fixed pattern having one bit of one state and two bits of the other state, clock input means connected to supply clock signals at three times said predetermined frequency to a clock input of said three-bit shift register, means responsive to said enable signal via said enable connection to rotate said fixed pattern in said three-bit shift register using said clock signals, so that said bit of one state appears in a given position of said three-bit shift register at said predetermined frequency, said clock connection being from said given position to the first shift register.

* * * * *

UNITED STATES PATENT OFFICE
CERTIFICATE OF CORRECTION

PATENT NO. : 3,961,138
DATED : June 1, 1976
INVENTOR(S) : Frank Fellinger

It is certified that error appears in the above—identified patent and that said Letters Patent are hereby corrected as shown below:

Column 13, line 58, "means" should be -- signals --.

Signed and Sealed this

Twelfth Day of October 1976

[SEAL]

Attest:

RUTH C. MASON
Attesting Officer

C. MARSHALL DANN
Commissioner of Patents and Trademarks